United States Patent
Ramirez de Santiago et al.

(10) Patent No.: US 10,337,545 B2
(45) Date of Patent: Jul. 2, 2019

(54) TOLERANCE COMPENSATING DEVICE

(71) Applicant: FORD GLOBAL TECHNOLOGIES, LLC, Dearborn, MI (US)

(72) Inventors: Carlos Ramirez de Santiago, Mexico City (MX); Jose Enrique Gallardo Almiray, Querétaro (MX)

(73) Assignee: Ford Global Technologies LLC, Dearborn, MI (US)

( * ) Notice: Subject to any disclaimer, the term of this patent is extended or adjusted under 35 U.S.C. 154(b) by 189 days.

(21) Appl. No.: 15/464,774

(22) Filed: Mar. 21, 2017

(65) Prior Publication Data

US 2018/0274574 A1    Sep. 27, 2018

(51) Int. Cl.
| | |
|---|---|
| *F16B 5/02* | (2006.01) |
| *F16B 21/08* | (2006.01) |
| *F16B 43/00* | (2006.01) |
| *F16B 2/22* | (2006.01) |
| *F16B 19/02* | (2006.01) |

(52) U.S. Cl.
CPC .......... *F16B 5/0225* (2013.01); *F16B 5/0233* (2013.01); *F16B 21/088* (2013.01); *F16B 43/00* (2013.01); *F16B 2/22* (2013.01); *F16B 19/02* (2013.01)

(58) Field of Classification Search
CPC ........ F16B 2/22; F16B 5/0208; F16B 5/0225; F16B 5/0233; F16B 5/0258; F16B 19/02; F16B 21/088; F16B 21/18; F16B 43/00; F16B 43/02; F16B 5/02; B60R 16/0222
USPC ............. 411/352, 388, 517, 546; 16/2.1, 2.4
See application file for complete search history.

(56) References Cited

U.S. PATENT DOCUMENTS

| | | | | |
|---|---|---|---|---|
| 2,354,748 A | * | 8/1944 | Franklin ................. | F16B 9/023 411/517 |
| 2,658,248 A | * | 11/1953 | Kost ..................... | F16B 37/042 411/182 |
| 2,663,895 A | * | 12/1953 | Petri ..................... | H02G 3/083 16/2.1 |
| 3,173,473 A | * | 3/1965 | Loveland ............... | F16B 9/023 165/80.1 |
| 4,656,689 A | * | 4/1987 | Dennis ................... | F16L 5/027 16/2.2 |

(Continued)

FOREIGN PATENT DOCUMENTS

| | | |
|---|---|---|
| CN | 201378904 Y | 1/2010 |
| DE | 202006013527 U1 | 12/2006 |

(Continued)

OTHER PUBLICATIONS

English Machine Translation of CN201378904Y.
(Continued)

*Primary Examiner* — Roberta S Delisle
(74) *Attorney, Agent, or Firm* — Vichit Chea; King & Schickli PLLC (57) ABSTRACT

A tolerance compensating device includes a body having a fastener receiver. A first set of tabs and a second set of tabs are provided around the fastener receiver. The first set of tabs include a first locator feature and the second set of tabs include a second locator feature wherein the first locator feature differs from the second locator feature. An assembly including the tolerance compensating device is also disclosed.

15 Claims, 6 Drawing Sheets

(56) References Cited

U.S. PATENT DOCUMENTS

| | | | | |
|---|---|---|---|---|
| 4,898,493 | A | * | 2/1990 | Blankenburg ........ F16B 21/088 403/326 |
| 6,688,826 | B2 | * | 2/2004 | Agha .................... F16B 41/002 411/107 |
| 7,708,489 | B2 | * | 5/2010 | Trotter ..................... A47C 3/18 403/194 |
| 7,990,722 | B2 | * | 8/2011 | Cao ..................... H01L 23/4006 165/185 |
| D682,103 | S | * | 5/2013 | Jedlicka ......................... D9/452 |
| 8,992,150 | B2 | * | 3/2015 | Korn ......................... F16B 5/02 411/352 |

FOREIGN PATENT DOCUMENTS

| | | |
|---|---|---|
| DE | 202010002447 U1 | 6/2010 |
| DE | 102012221228 A1 | 5/2014 |
| DE | 102012221679 A1 | 5/2014 |
| ES | 2415956 A2 | 7/2013 |

OTHER PUBLICATIONS

English Machine Translation of DE102012221228A1.
English Machine Translation of DE102012221679A1.
English Machine Translation of DE202006013527U1.
English Machine Translation of DE202010002447U1.
English Machine Translation of ES2415956A2.

\* cited by examiner

TOLERANCE COMPENSATING DEVICE

TECHNICAL FIELD

This document relates generally to the mechanical fastener field and, more particularly, to a tolerance compensating device for accommodating tolerance variations in workpieces when those workpieces are assembled together.

BACKGROUND

Tolerance compensating devices for accommodating variations in dimensional tolerances of manufactured parts and workpieces such as those utilized in the assembly of motor vehicles are known in the art. By accommodating variations in manufacturing tolerances of workpieces, it is possible to avoid manufacturing and assembly line delays and issues while maintaining desired fit and finish or functional clearances between workpieces. Tolerance compensation is particularly important where an assembly includes a high number of workpieces or components, a high level of complexity or a significant styling component.

This document relates to a new and improved tolerance compensating device that is inexpensive to produce while accommodating a wide range of manufacturing tolerances. As such, the new and improved tolerance compensating device represents a significant advance in the art.

SUMMARY

In accordance with the purposes and benefits described herein, a new and improved tolerance compensating device is provided. That tolerance compensating device comprises a body including (a) a fastener receiver and (b) a first set of tabs and a second set of tabs around the fastener receiver. The first set of tabs includes a first locator feature. The second set of tabs includes a second locator feature. The first locator feature differs from the second locator feature in order to provide versatility and greater accommodation of tolerance variation between workpieces to be connected together into an assembly.

The first set of tabs and the second set of tabs may be radially arrayed around the fastener receiver. The first locator feature on the first set of tabs may include a first plurality of locator shoulders. Similarly, the second locator feature on the second set of tabs may include a second plurality of locator shoulders. The first set of locator shoulders are offset axially from the second set of locator shoulders.

The body may further include a third set of tabs around the fastener receiver. That third set of tabs may include a third locator feature that is different from the first locator feature and the second locator feature. The third locator feature may include a third plurality of locator shoulders axially offset from the first plurality of locator shoulders and the second plurality of locator shoulders.

Still further, the body may include a fourth set of tabs around the fastener receiver. That fourth set of tabs may include a fourth locator feature different from the first locator feature, the second locator feature and the third locator feature. The fourth locator feature may include a fourth plurality of locator shoulders axially offset from the first plurality of locator shoulders, the second plurality of locator shoulders and the third plurality of locator shoulders.

In at least one of the many possible embodiments, the body includes twelve tabs. A first three of those twelve tabs may comprise the first set of tabs, a second three of those twelve tabs may comprise the second set of tabs, a third three of those twelve tabs may comprise a third set of tabs and a fourth three of those twelve tabs may comprise the fourth set of tabs. The various sets of tabs may alternate around the fastener receiver.

The body may also include a well and the fastener receiver may be provided in that well. In addition, the first set of tabs, the second set of tabs, the third set of tabs and the fourth set of tabs may extend parallel to a sidewall of that well.

In accordance with an additional aspect, an assembly is provided comprising a first workpiece, a second workpiece and a tolerance compensating device. That tolerance compensating device includes a body having (a) a fastener receiver and (b) a first set of tabs and a second set of tabs around the fastener receiver. The first set of tabs includes a first locator feature. The second set of tabs includes a second locator feature. The first locator feature differs from the second locator feature. Further, the assembly includes a fastener securing the first workpiece to the second workpiece. That fastener extends through the fastener receiver.

The first workpiece of the assembly may include a device receiver and the tolerance compensating device may be held in that device receiver. The first locator feature or the second locator feature may engage a margin of the first workpiece defining the device receiver. Further, the fastener may engage the second workpiece. That fastener may be a screw or other fastening device.

In the following description, there are shown and described several preferred embodiments of the tolerance compensating device and the related assembly incorporating that tolerance compensating device. As it should be realized, the tolerance compensating device and the assembly are capable of other, different embodiments and their several details are capable of modification in various, obvious aspects all without departing from the tolerance compensating device and assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tolerance compensating device and assembly and together with the description serve to explain certain principles thereof.

Reference will now be made in detail to the present preferred embodiments of the tolerance compensating device and the assembly, examples of which are illustrated in the accompanying drawing figures.

DETAILED DESCRIPTION

Reference is now made to FIGS. 1-5 illustrating the new and improved tolerance compensating device 10. As illustrated, the tolerance compensating device 10 includes a body 12. That body 12 may be made from a flexible and resilient material. For example, the body 12 may be molded as a one-piece integral structure from various materials including, for example, acetal, resin, thermoplastic polyolefin (TPO) filled and nylon. As shown, the body 12 includes a well 14. A fastener receiver 16, in the form of an aperture, is provided in the well 14.

In the illustrated embodiment, the body 12 also includes twelve tabs, generally designated by reference numeral 18. Those twelve tabs 18 are radially arrayed around the fastener receiver 16 and extend substantially parallel to the sidewall 20 of the well 14. Thus, as should be appreciated, the body 12 includes a central axis A that runs through the fastener receiver 16 in the center of the well 14. See FIG. 5.

More specifically, in the illustrated embodiment the twelve tabs 18 comprise three tabs each of four different tab sets. As illustrated, the first set of tabs 22 includes a first locator feature 24. That first locator feature 24 includes a first plurality of locator shoulders 26. The second set of tabs 28 includes a second locator feature 30. That second locator feature 30 includes a second plurality of locator shoulders 32. The third set of tabs 34 includes a third locator feature 36. That third locator feature 36 comprises a third plurality of locator shoulders 38. The fourth set of tabs 40 includes a fourth locator feature 42. The fourth locator feature 42 includes a fourth plurality of locator shoulders 44.

In the illustrated embodiment the first set of tabs 22, the second set of tabs 28, the third set of tabs 34 and the fourth set of tabs 40 alternate around the fastener receiver 16 on the body 12. Thus, one of the first set of tabs 22 is provided between one of the fourth set of tabs 40 and one of the second set of tabs 28. One of the second set of tabs 28 is provided between one of the first set of tabs 22 and one of the third set of tabs 34. One of the third set of tabs 34 is provided between one of the second set of tabs 28 and one of the fourth set of tabs 40. One of the fourth set of tabs 40 is provided between one of the third set of tabs 34 and one of the first set of tabs 22.

As should be appreciated from reviewing the drawing Figures, the first locator feature 24 including the first plurality of locator shoulders 26, the second locator feature 30 including the second plurality of locator shoulders 32, the third locator feature 36 including the third plurality of locator shoulders 38 and the fourth locator feature 42 including the fourth plurality of shoulders 44 all differ. More specifically, in the illustrated embodiment, the first locator feature 24 includes three locator shoulders 26 while the second locator feature 30 includes two locator shoulders 32, the third locator feature 36 includes two locator shoulders 38 and the fourth locator feature 42 includes two shoulders 44. In addition, the first plurality of locator shoulders 26, the second plurality of locator shoulders 32, the third plurality of locator shoulders 38 and the fourth plurality of locator shoulders 44 are all offset axially from one another along the central axis A of the tolerance compensating device 10. Together, the flexibility and resiliency of the tabs 18 of the body 12 and the differing locator features 24, 30, 36 and 42 including the axially offset first plurality of locator shoulders 26, second plurality of locator shoulders 32, third plurality of locator shoulders 38 and fourth plurality of locator shoulders 44 enhance the versatility of the tolerance compensating device 10 allowing the device to compensate for a wide range of tolerance variation between components or workpieces to be assembled.

Figure 1:
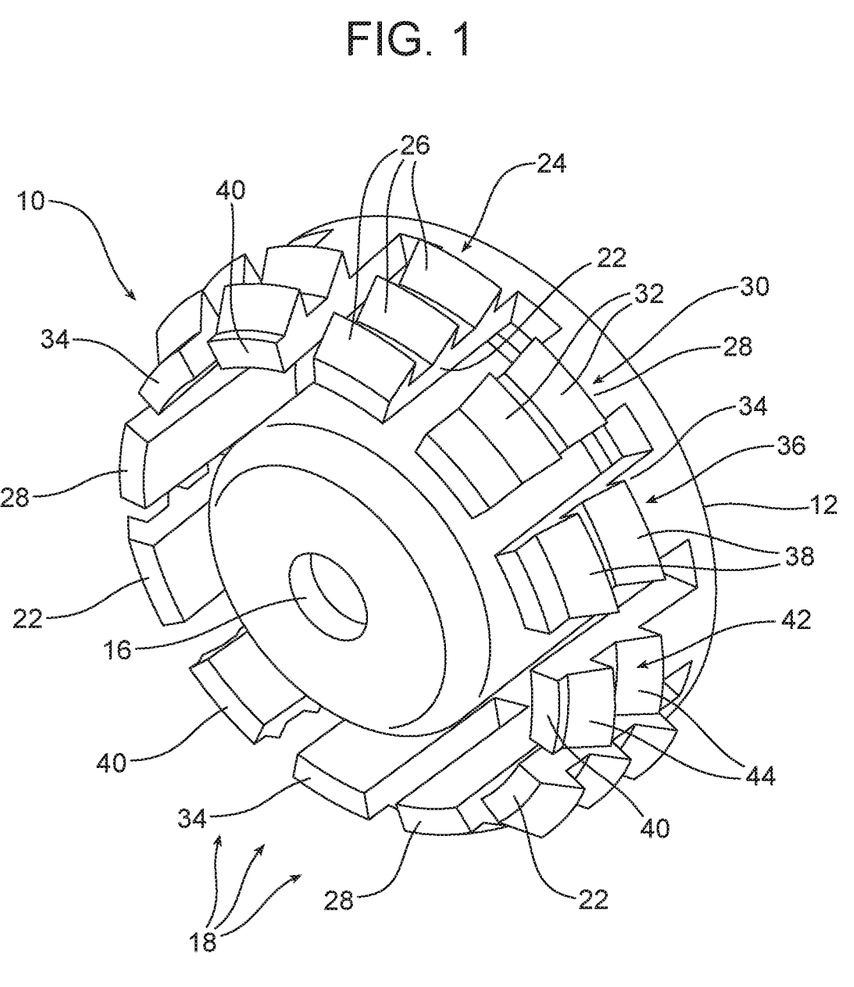
FIG. 1 is a perspective view of the tolerance compensating device.
Figure 2:
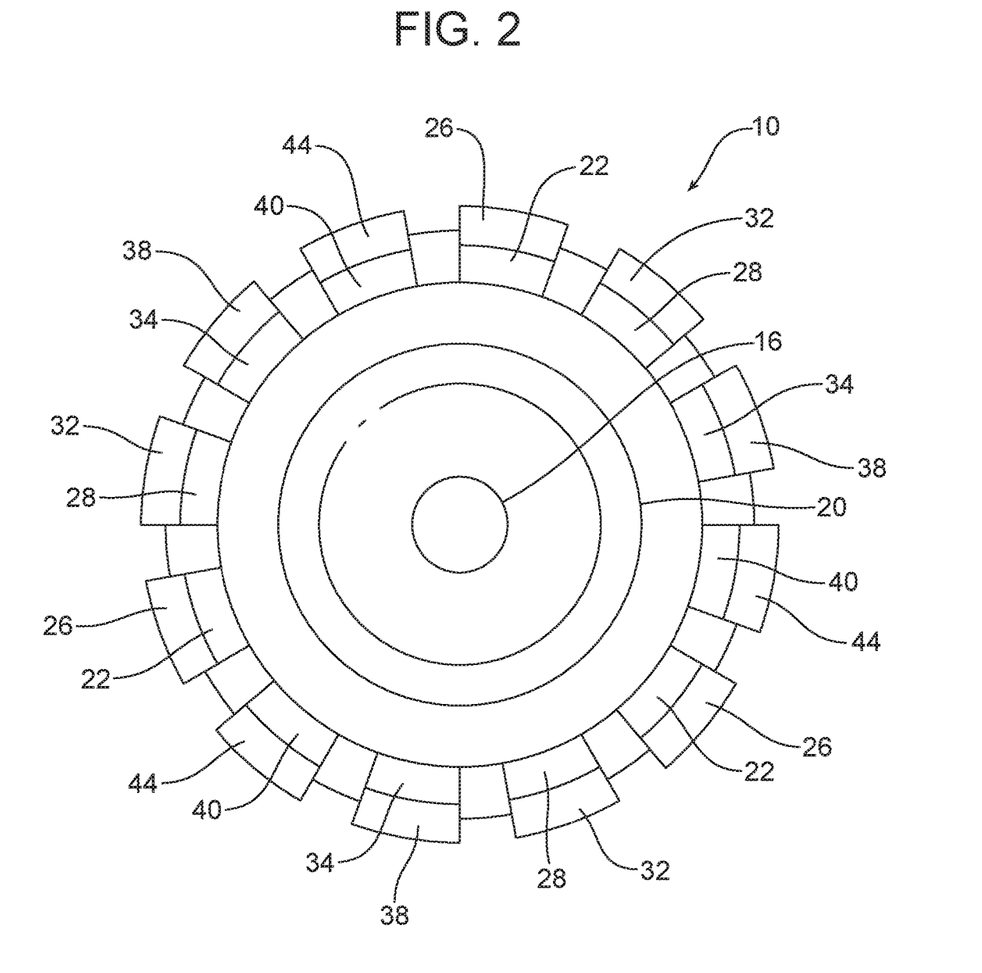
FIG. 2 is a front plan view of the tolerance compensating device illustrated in FIG. 1.
Figure 3:
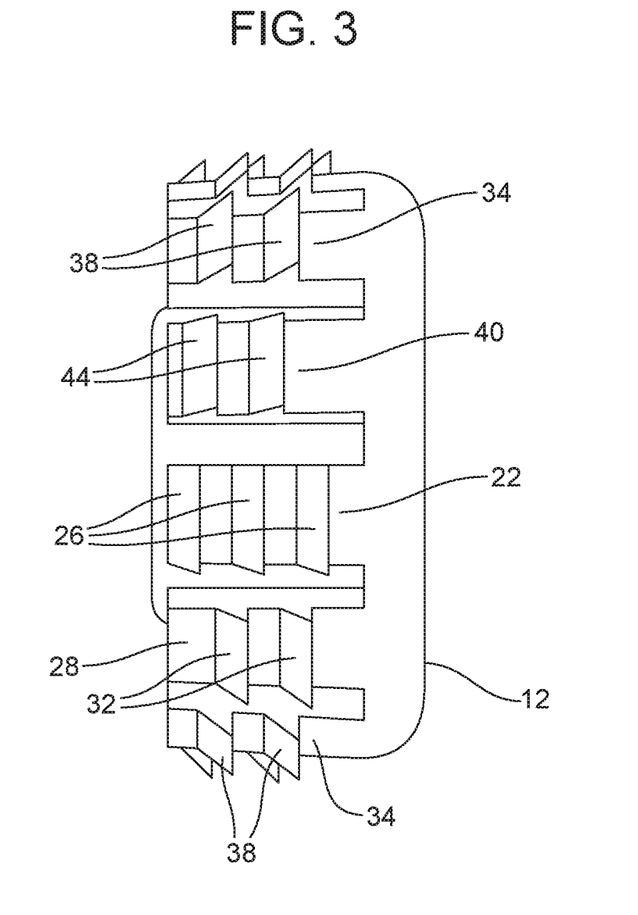
FIGS. 3 and 4 are two different side elevational views of the tolerance compensating device.
Figure 4:
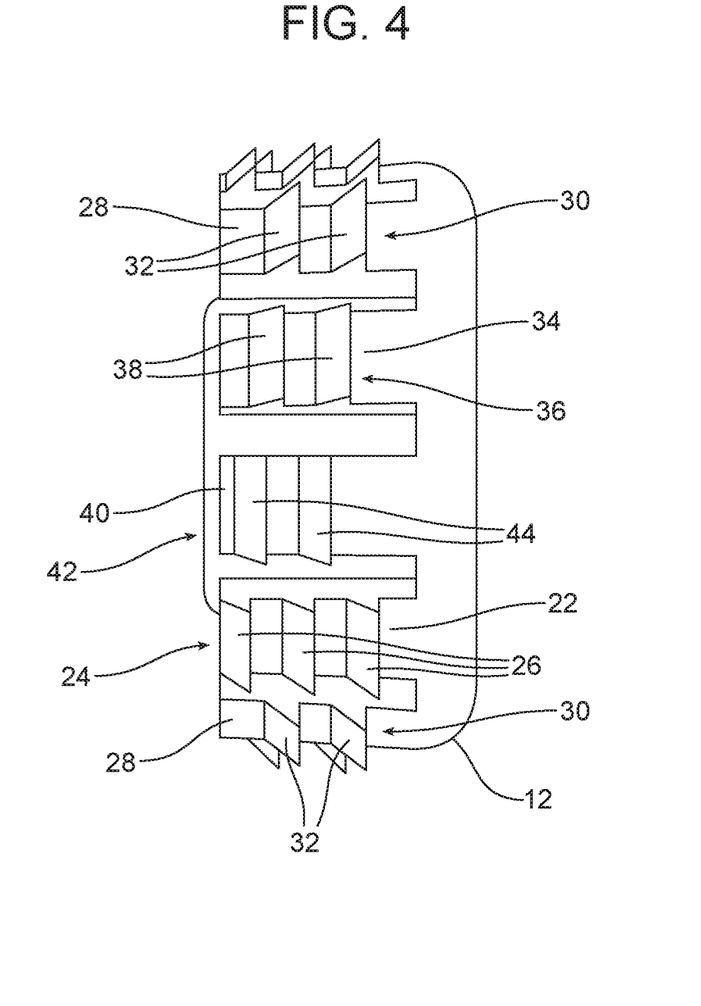
Figure 5:
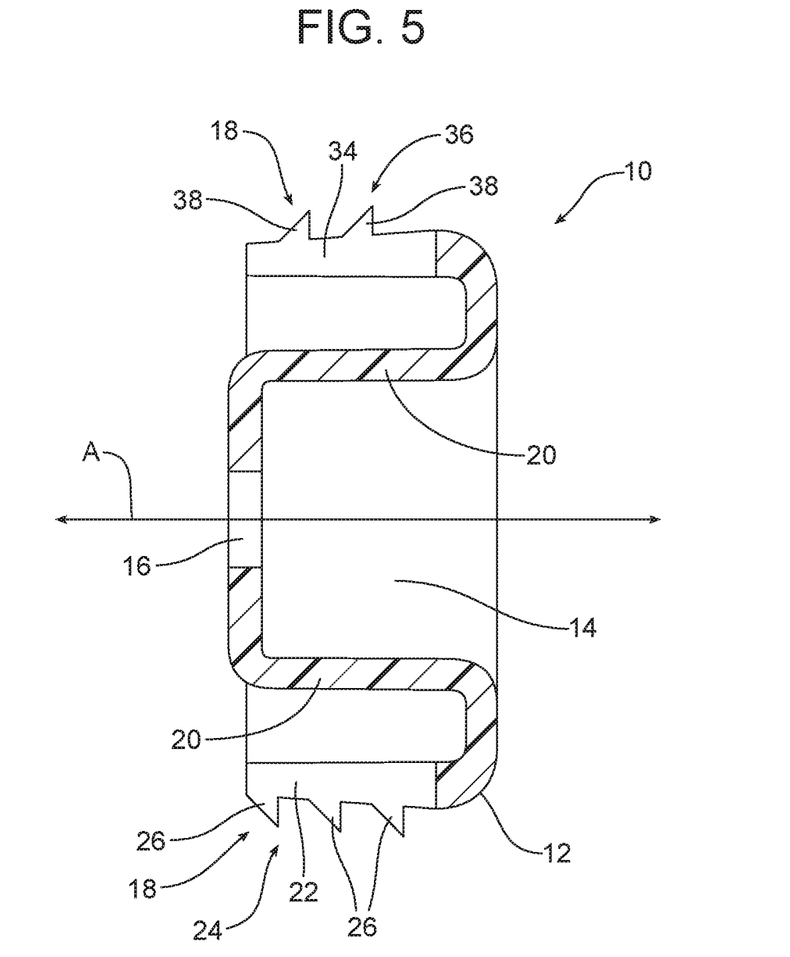
FIG. 5 is a detailed cross-sectional view of the tolerance compensating device.
Figure 6:
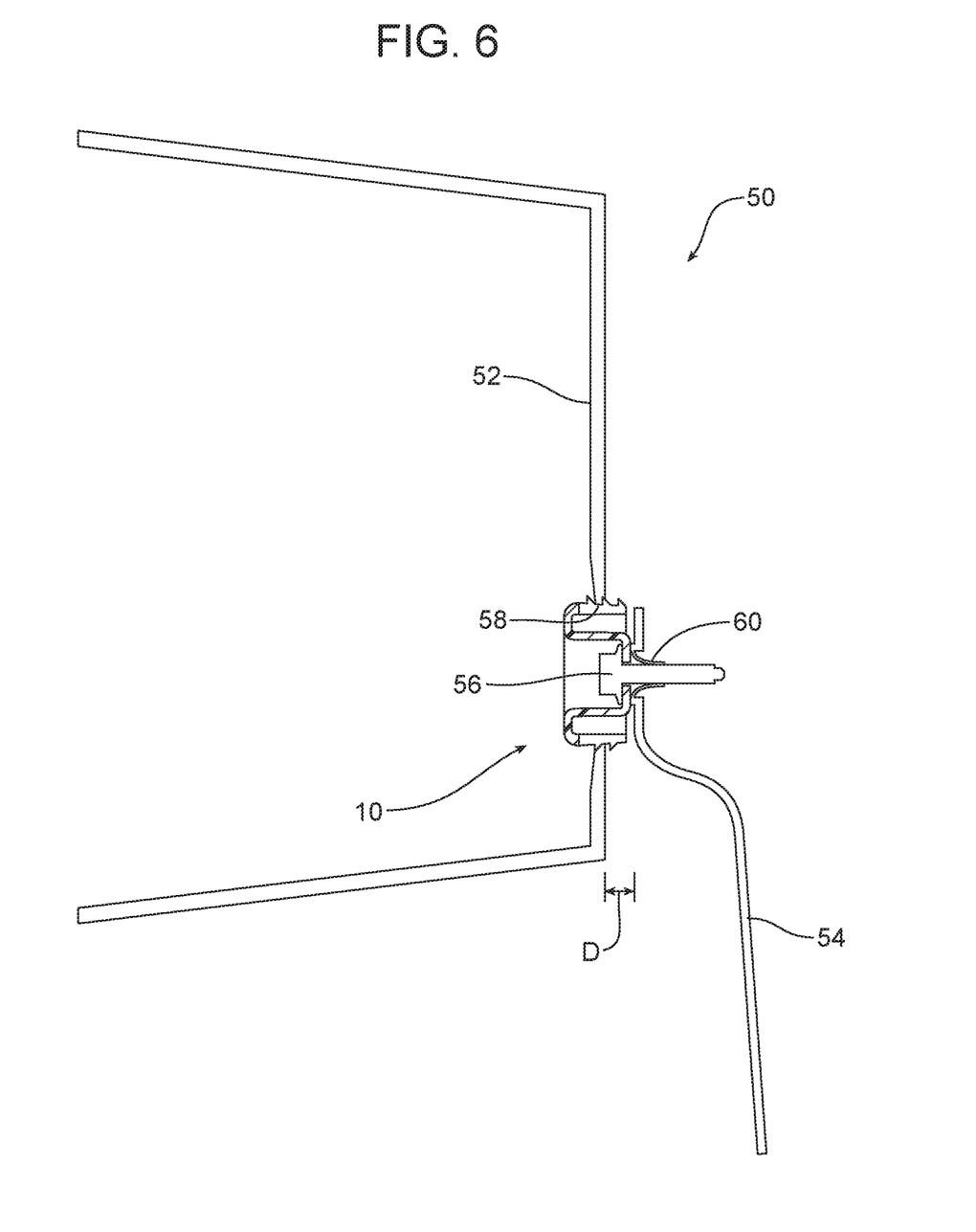
FIG. 6 is a cross-sectional view of an assembly including a first workpiece, a second workpiece and the tolerance compensating device illustrated in FIGS. 1-5 as well as a fastener for securing the workpieces together.

Reference is now made to FIG. 6 illustrating a new and improved assembly 50 comprising first component or first workpiece 52, a second component or second workpiece 54, the tolerance compensating device 10 illustrated in FIGS. 1-5 and a fastener 56 for securing the first workpiece 52 to the second workpiece 54. In the illustrated embodiment, the first workpiece 52 comprises a radio cage and the second workpiece 54 comprises a mounting bracket.

As illustrated, the first workpiece 52 includes a device receiver 58 in the form of an opening sized and shaped to receive the tolerance compensating device 10. The tolerance compensating device 10 is inserted into the device receiver 58 in the first workpiece 52 and held in place in the device receiver by the resilient tabs 18. The fastener 56 is then inserted through the fastener receiver 16 in the tolerance compensating device 10 so as to engage in the screw boss 60 of the second workpiece 54. As the fastener 56 is tightened in the screw boss 60 of the second workpiece 54, the tolerance compensating device 10 compensates for the distance between the first workpiece 52 and the second workpiece 54 which may vary depending upon the manufacturing tolerances of the particular first workpiece 52 and second workpiece 54 being connected together. More specifically, one locator feature of the first locator feature 24, second locator feature 30, third locator feature 36 and fourth locator feature 42 includes a plurality of locator shoulders 26, 32, 38 and 44 that are offset axially along the central axis A of the tolerance compensating device 10 the necessary distance to provide appropriate compensation for the tolerance distance D between the first workpiece 52 and second workpiece 54 thereby ensuring proper fit and finish and/or proper functional clearance.

In summary, the tolerance compensating device 10 is characterized by a number of benefits and advantages. The tolerance compensating device 10 may be molded as a one-piece integral structure in a simple and very cost-effective manner. Advantageously, the tolerance compensating device 10 includes four sets of tabs 22, 28, 34 and 40 incorporating four different locator features 24, 30, 36 and 42 characterized by four different plurality of locator shoulders 26, 32, 38 and 44. Those four different plurality of locator shoulders 26, 32, 38 and 44 are offset axially along the central axis A of the tolerance compensating device 10 so as to accommodate a wide range of manufacturing tolerances in an efficient and effective manner. Thus, the tolerance compensating device 10 is particularly effective in connecting multiple workpieces 52, 54 wherein the manufacturing tolerances of the various workpieces can have an additive effect producing a wide tolerance range in the final assembly. As a result the tolerance compensating device 10 is particularly effective in maintaining proper fit and finish and/or desired functional clearances when the workpieces are finally assembled.

The foregoing has been presented for purposes of illustration and description. It is not intended to be exhaustive or to limit the embodiments to the precise form disclosed. Obvious modifications and variations are possible in light of the above teachings. For example, in the illustrated embodiment, the tolerance compensating device includes four different sets of tabs 22, 28, 34 and 40 incorporating four different locator features 24, 30, 36 and 42. It should be appreciated that the tolerance compensating device 10 may include as few as two different sets of tabs and more than four different tabs if desired. In the illustrated embodiment, the first locator feature 24 comprises three locator shoulders 26 while the second, third and fourth locator features 30, 36, 42 each comprise two shoulders 32, 38 and 44 respectively. It should be appreciated that each set of shoulders may comprise a minimum of one shoulder and a maximum of more than three shoulders if desired. These shoulders would, however, continue to be offset axially in order to maximize the ability of the tolerance compensating device 10 to accommodate different manufacturing tolerances between the workpieces 52, 54 being connected together into the assembly 50 utilizing the fastener 56 and the tolerance compensating device 10. All such modifications and variations are within the scope of the appended claims when interpreted in accordance with the breadth to which they are fairly, legally and equitably entitled.

What is claimed:

1. A tolerance compensating device, comprising:
a body including a fastener receiver and a first set of tabs and a second set of tabs around said fastener receiver, said first set of tabs including a first locator feature and said second set of tabs including a second locator feature wherein (a) said first locator feature differs from said second locator feature, (b) said first set of tabs and said second set of tabs are radially arrayed around said fastener receiver and (c) said first locator feature includes a first plurality of locator shoulders and said second locator feature includes a second plurality of locator shoulders wherein said first plurality of locator shoulders are offset axially from said second plurality of locator shoulders.

2. The tolerance compensating device of claim 1, wherein said body further includes a third set of tabs around said fastener receiver.

3. The tolerance compensating device of claim 2, wherein said third set of tabs includes a third locator feature different from said first locator feature and said second locator feature.

4. The tolerance compensating device of claim 3, wherein said third locator feature includes a third plurality of locator shoulders axially offset from said first plurality of locator shoulders and said second plurality of locator shoulders.

5. The tolerance compensating device of claim 4, wherein said body includes a fourth set of tabs around said fastener receiver.

6. The tolerance compensating device of claim 5, wherein said fourth set of tabs includes a fourth locator feature different from said first locator feature, said second locator feature and said third locator feature.

7. The tolerance compensating device of claim 6, wherein said fourth locator feature includes a fourth plurality of locator shoulders axially offset from said first plurality of locator shoulders, said second plurality of locator shoulders and said third plurality of locator shoulders.

8. The tolerance compensating device of claim 7, wherein said body includes twelve tabs.

9. The tolerance compensating device of claim 8, wherein a first three of said twelve tabs comprise said first set of tabs, a second three of said twelve tabs comprise said second set of tabs, a third three of said twelve tabs comprise said third set of tabs and a fourth three of said twelve tabs comprise said fourth set of tabs.

10. The tolerance compensating device of claim 9, wherein said first set of tabs, said second set of tabs, said third set of tabs and said fourth set of tabs alternate around said fastener receiver.

11. The tolerance compensating device of claim 10, wherein said body includes a well and said fastener receiver is provided in said well.

12. An assembly, comprising:
a first workpiece;
a second workpiece
a tolerance compensating device including a body having (a) a fastener receiver and (b) a first set of tabs and a second set of tabs around said fastener receiver, said first set of tabs including a first locator feature and said second set of tabs including a second locator feature wherein said first locator feature differs from said second locator feature, said first set of tabs and said second set of tabs are radially arrayed around said fastener receiver and said first locator feature includes a first plurality of locator shoulders and said second locator feature includes a second plurality of locator shoulders wherein said first plurality of locator shoulders are offset axially from said second plurality of locator shoulders; and
a fastener securing said first workpiece to said second workpiece, said fastener extending through said fastener receiver.

13. The assembly of claim 12, wherein said first workpiece includes a device receiver, said tolerance compensating device being held in said device receiver.

14. The assembly of claim 13, wherein said first locator feature or said second locator feature engages a margin of said first workpiece defining said device receiver.

15. The assembly of claim 14, wherein said fastener engages said second workpiece.

* * * * *